United States Patent [19]
Federspiel

[11] 3,957,123
[45] May 18, 1976

[54] TRACTOR VEHICLE MOUNTED LIFT ASSEMBLY PROVIDED WITH LATCH MEANS

[75] Inventor: Joseph A. Federspiel, Port Washington, Wis.

[73] Assignee: FMC Corporation, San Jose, Calif.

[22] Filed: Nov. 30, 1973

[21] Appl. No.: 420,475

Related U.S. Application Data

[62] Division of Ser. No. 307,918, Nov. 20, 1972, Pat. No. 3,811,338.

[52] U.S. Cl. ............................ 172/481; 172/304; 172/469; 292/61; 403/325
[51] Int. Cl.² ................ A01B 63/10; A01B 63/104; A01B 63/118; E05C 5/00
[58] Field of Search .......... 172/481, 674, 466, 469, 172/482, 488, 489, 303, 307, 457, 468, 470, 472, 474, 480, 484–487, 452, 297, 299–300, 302, 304, 249, 481; 24/211 L, 213 R, 221 K; 148/408; 292/60, 61; 403/325

[56] References Cited
UNITED STATES PATENTS

| | | | |
|---|---|---|---|
| 741,729 | 10/1903 | Smethers | 172/470 |
| 1,298,251 | 3/1919 | Pehel | 24/221 K |
| 1,603,159 | 10/1926 | Snyder | 24/221 K |
| 1,737,891 | 12/1929 | Parkins | 292/60 |
| 2,124,203 | 7/1938 | Lindgren et al. | 172/474 X |
| 2,368,312 | 1/1945 | Luger | 172/300 X |
| 2,569,389 | 9/1951 | Seaholm | 172/307 |
| 2,631,513 | 3/1953 | Silver et al. | 172/307 X |
| 2,655,853 | 10/1953 | Lee | 172/307 X |
| 3,058,243 | 10/1962 | McGee | 172/481 X |
| 3,066,375 | 12/1962 | Knowles et al. | 24/211 L |
| 3,397,000 | 8/1968 | Nakanishi | 292/61 |
| 3,646,623 | 3/1972 | Harris et al. | 248/408 X |
| 3,658,137 | 4/1972 | Seymour et al. | 172/469 X |
| 3,751,071 | 8/1973 | Patterson et al. | 172/679 X |

FOREIGN PATENTS OR APPLICATIONS

| | | | |
|---|---|---|---|
| 580,851 | 8/1959 | Canada | 172/485 |
| 226,018 | 12/1924 | United Kingdom | 292/60 |

*Primary Examiner*—Edgar S. Burr
*Assistant Examiner*—Steven A. Bratlie
*Attorney, Agent, or Firm*—C. E. Tripp; A. M. Lesniak

[57] ABSTRACT

A vehicle mounted lift assembly having latch mechanisms for latching pivoted lift arms in an uplift position whereby an implement, particularly a powered rotary mower, connected to the lift arms can be automatically latched in an elevated position while other implements are being raised or lowered by the lift assembly. The latch mechanisms each include a pivotal and an axially translatable bolt having a non-circular end portion which is slidably received in a complementary non-circular opening when in an arm latching position. The bolt is manually movable to an unlatched position with the non-circular portion moved axially out of engagement with the non-circular opening, and with the bolt then being pivoted about its axis to preclude registration of the non-circular portion with the non-circular opening. A combination torsion-compression spring is prestressed to normally exert a compressive force tending to hold the bolt in latching position, and to normally exert a torsional force tending to pivot and maintain the bolt in its unlatched position. A cam face on the latch bolt automatically locks the associated lift arm in raised position in response to movement of the lift arm into its raised position only if the bolt has been pivoted to its latching position.

1 Claim, 8 Drawing Figures

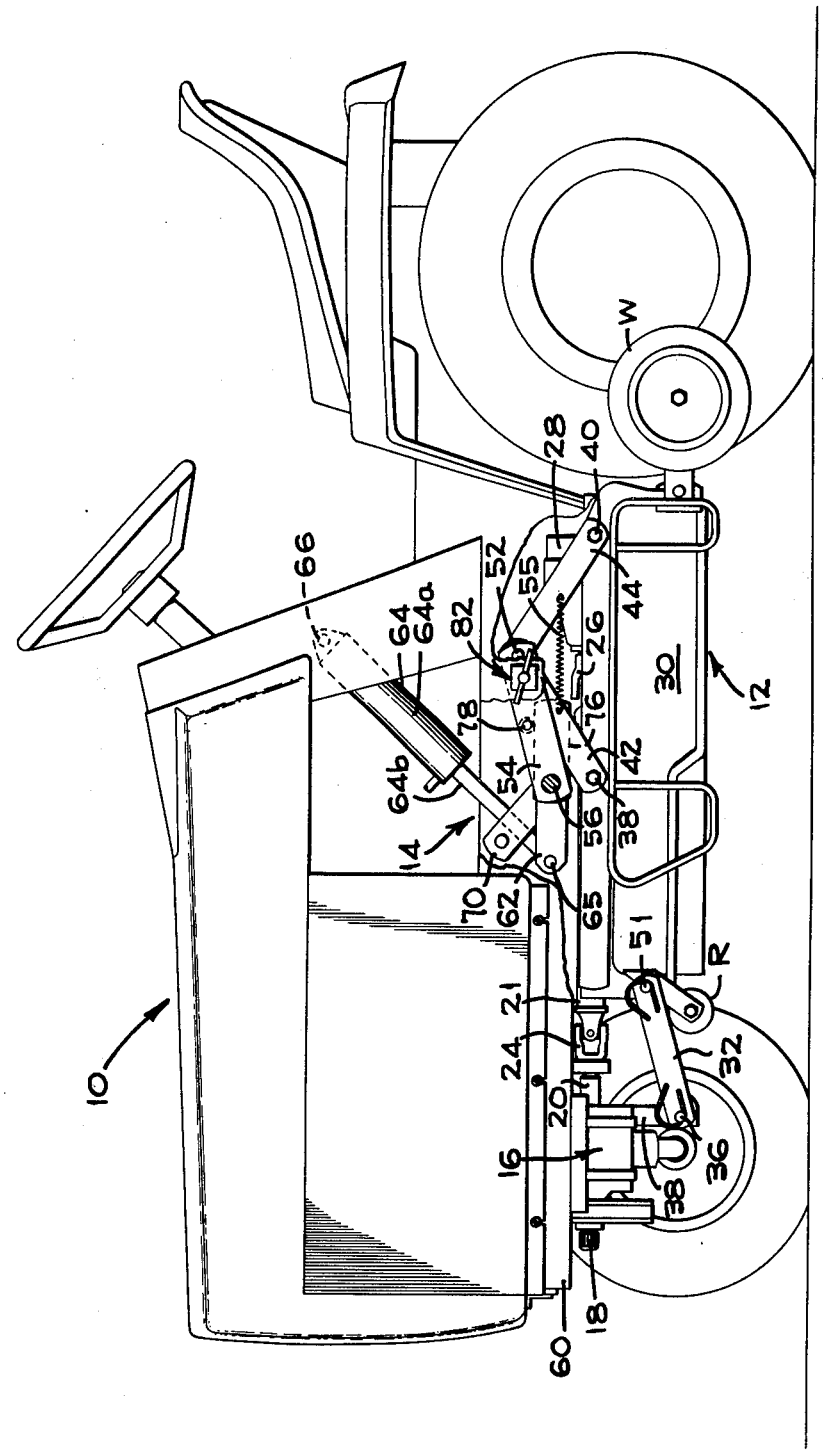

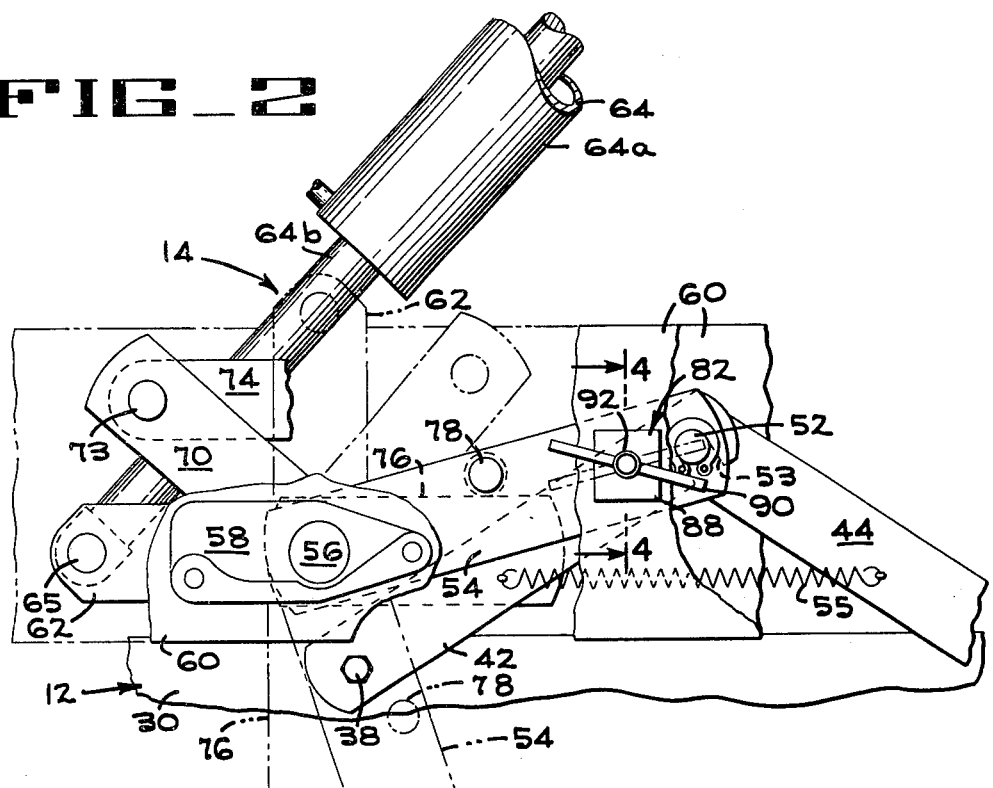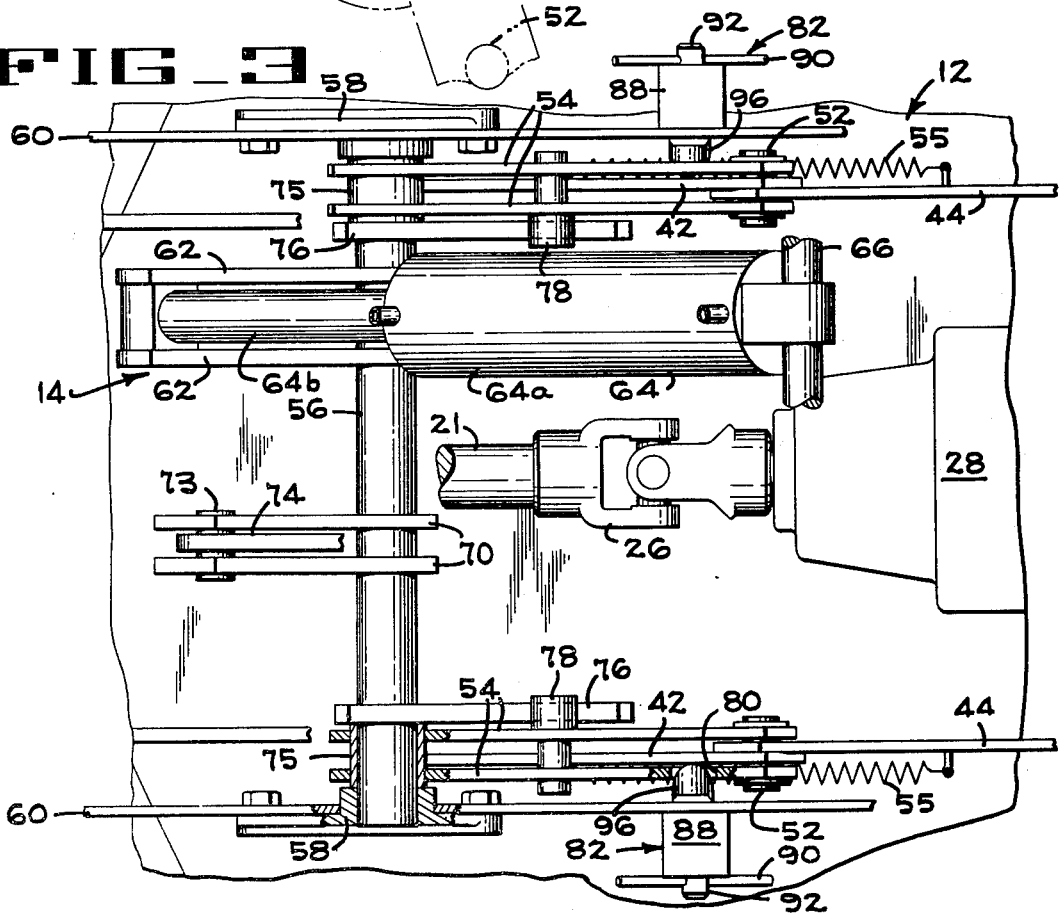

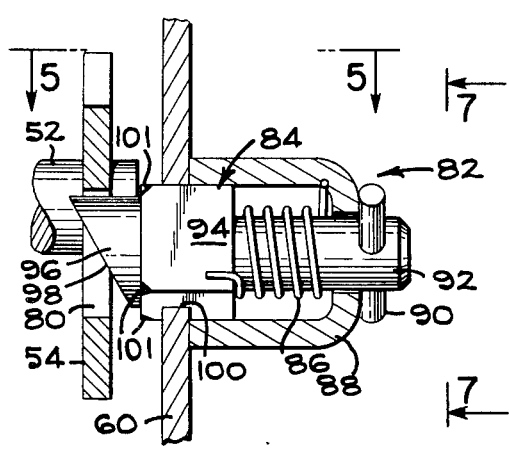
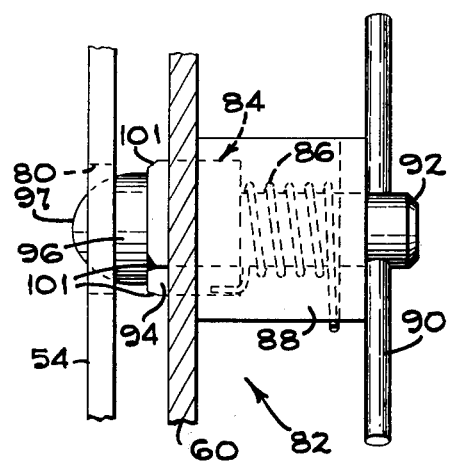
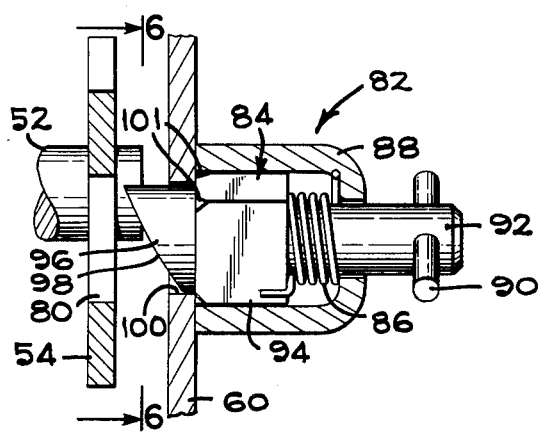
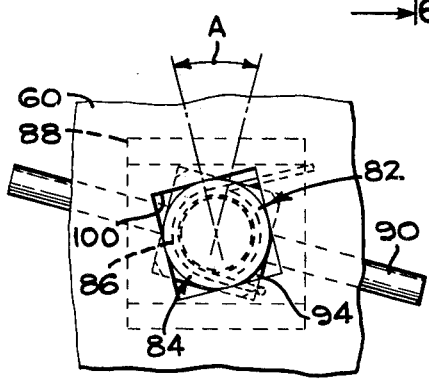
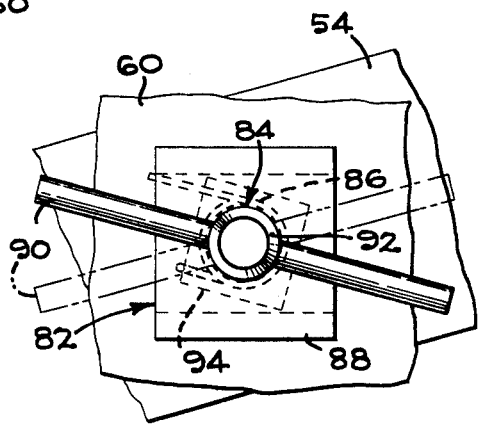

TRACTOR VEHICLE MOUNTED LIFT ASSEMBLY PROVIDED WITH LATCH MEANS

This is a division of application Ser. No. 307,918, filed Nov. 20, 1972, now U.S. Pat. No. 3,811,338, which issued on May 21, 1974.

BACKGROUND OF THE INVENTION

This application contains subject matter described and claimed in U.S. patent application Ser. No. 304,173 filed on Nov. 6, 1972 and U.S. patent application Ser. No. 312,011 filed on Dec. 14, 1972, said applications being assigned to the assignee of the present invention and which issued as U.S. Pat. No. 3,840,253 on Apr. 8, 1974, and U.S. Pat. No. 3,796,028 on Mar. 12, 1974, respectively.

FIELD OF THE INVENTION

The present invention relates to a vehicle mounted lift assembly adapted for use in connecting implements to the vehicle and having latch means for latching lift arms in raised positions in order to latch an attached implement in an elevated position.

DESCRIPTION OF THE PRIOR ART

The assignee of the present invention manufactures certain tractors or vehicles that have a hydraulically powered lift assembly situated between the front and rear vehicle wheels. The purpose of the lift assembly is to allow for the attachment of different implements to the vehicle in order that specific tasks may be performed. There are numerous implements, some of which can be powered by a power take off shaft driven by the tractor engine. The implements can be placed in front of or behind the vehicle and can be hitched to parts of the vehicle, and/or to its lift assembly, so that they can be pushed or pulled by the tractor. There are some implements such as rotary mowers which are placed under the vehicle and are hitched to the lift assembly.

The lift assembly has certain limitations that affect or restrict the manner in which it and the implement can be utilized. A major limitation of the lift assembly is that hydraulic fluid supplied to the hydraulic cylinder of its power unit, sometimes leaks past the piston head within the cylinder. The fluid leakage causes gradual movement of the piston into the cylinder and unintended, progressive lowering of the mower from its elevated position. If the fluid leakage is relatively slight, the piston can hold the mower in the elevated position for many hours but if the fluid leakage is relatively large the piston can hold the mower in its raised position for only a short time before the weight of the mower together with the fluid leakage about the piston head causes the mower to descend from its elevated position. The latter situation constitutes a nuisance as it requires that the mower be repeatedly relifted, at intervals of several minutes, by actuating the piston to again extend it out of the cylinder in order to hold the mower in a raised position.

Another limitation of the lift assembly is that the mower supporting lift arms are pivoted, not keyed, to the actuating shaft of the lift assembly, and will remain in their raised position only as long as the assembly's pickup arms, which are keyed to the shaft, are held upward in contact with the pivoted mower lift arms. When the piston is hydraulically operated to cause the pickup arms to swing downward, the weight of the mower causes the pivoted lift arms to swing downward by gravity. Hence, the mower can only be held in a raised position as long as the pickup arms are positioned to support the pivoted lift arms in a raised position. Accordingly, it is not feasible with the prior art apparatus to raise or lower an implement situated behind the tractor and connected to other nonpivoted lift arms while the mower is connected to the vehicle because the mower will also be raised and lowered.

The latter limitation discussed in the preceding paragraph makes it necessary to actually detach the mower from the tractor when the mower is not in use but another implement, such as a cultivator is in use and is disposed behind the tractor and connected to other lift arms keyed to the shaft. Although it takes less than a minute to detach the mower from the lift assembly, it may take about ten minutes or so to remove the mower from under the tractor body because the mower, which may weigh about 200 pounds, must be slid from under the tractor body. The physical effort required to remove the implement, and the time lost in doing so, is a source of considerable inconvenience. Also, the detached mower must be reattached to the tractor when it is again desired to use the mower.

It is desirable to improve the above discussed lift assembly to eliminate its noted limitations by providing convenient, efficient means adapted for holding the aforementioned pivoted lift arms in an uplifted position while the aforementioned pickup arms are lowered out of lifting contact with the pivoted lift arms.

SUMMARY OF THE INVENTION

This invention provides an improved tractor or vehicle mounted lift assembly having equivalent latch mechanisms on the right and left sides of the vehicle for automatically accomplishing selective latching of pivoted lift arms in a raised position. In accordance with the invention, each latch mechanism can latch the associated pivoted lift arm and implement to the pivoted lift arm, in a raised position while other nonpivoted lift arms can be swung back and forth independently of the latched lift arm means in order to raise or lower another implement connected to the nonpivoted lift arm means.

In accordance with the invention the latch means includes two latch mechanisms that can be hand manipulated to selectively position and maintain a movable latch member in either a latching or unlatching position. Each mechanism includes means for releasably locking its latch member or bolt in the unlatched position by the torsional action of a torsion-compression spring mounted upon the member. When it is desired to latch the pivoted lift arms in the latching position, the latch member is normally twisted against the torsional force of the spring until the non-circular portion registers with and is moved into the non-circular opening by the compressive force of the spring. Each latch member is provided with a slanted cam face oriented to allow the associated lift arm to swing upward against the cam face to push the latch member laterally away from its latch engaging position until the fully raised position is attained whereupon the spring moves the latch member laterally toward the lift arm to effect its latching.

In summary, the invention, in its broader aspects, provided an improved vehicle mounted lift assembly adapted for automatically latching pivoted lift arms in a raised position to prevent downward swinging of the means by the action of gravity forces on the arm. The assembly's two latch mechanisms can be locked, at will, in an unlatched position so that shock loads to the vehicle will not result in unintentional latching of the arms.

Accordingly, it is a major object of the invention to provide an improved vehicle mounted lift assembly having pivoted lift arms that can be swung upward to a raised position near latch means capable of automatically latching the arm means in the raised position. Whether or not automatic latching occurs is determined solely by the vehicle's operator who can manually set the latch mechanisms in either a latching or unlatching position prior to the time the arms are swung to their raised positions.

Another major object of the invention is to provide means for latching pivoted arms of a vehicle's lift assembly, in a raised position to preclude swinging movement of the arms downward from the raised position whereby an implement may be flotationally supported under the vehicle by the pivoted arms and kept in a raised or elevated position by latch mechanisms while other implements are raised or lowered by the lift assembly.

Another object is to provide an improved latch mechanism.

The above and other objects of the present invention as well as advantages and features of the invention will be made clearer upon review of the following discussion of an embodiment of the present invention taken in conjunction with the accompanying drawings.

BRIEF DESCRIPTION OF THE DRAWINGS

FIG. 1 is a partially cutaway side elevation of a tractor vehicle having an implement in the form of a rotary mower supported under the vehicle by means of a lift assembly shown holding the implement in a raised position above ground level.

FIG. 2 is a side elevation of part of the lift assembly partially shown in FIG. 1, the view showing one of the two latch mechanisms mounted on opposed sections of longitudinal frames. The view illustrates the latching of a pivoted lift arm in a raised position.

FIG. 3 is a plan of the structure illustrated in FIG. 2 and further illustrating the latching of pivoted lift arms in order to hold an implement in a raised position as shown in FIG. 1.

FIG. 4 is a vertical section taken along line 4—4 of FIG. 2 of a frame section and latch mechanism mounted thereon and of a lift arm shown latched up with the latch mechanism.

FIG. 5 is a fragmentary plan taken along line 5—5 of FIG. 4 to further illustrate the latch mechanism shown in FIG. 4.

FIG. 6 is a simplified elevation taken generally along line 6—6 of FIG. 8 but illustrating the latch bolt when shifted to its unlatched position.

FIG. 7 is a simplified elevation taken along line 7—7 of FIG. 4 and illustrating the way in which the illustrated latch mechanism is effective to latch a raised, pivoted lift arm, a latch handle being shown in dotted lines in an unlatched position.

FIG. 8 is a section similar to FIG. 4 but showing the bolt locked in the unlatched position.

DESCRIPTION OF THE PREFERRED EMBODIMENT

FIG. 1 illustrates a tractor or vehicle 10 supporting a raised rotary mower or implement 12 under the tractor body between the front and rear wheels. The implement 12 is raised and held off the ground by a lift assembly 14. In FIG. 1 the left front tire is omitted to illustrate a power take off unit 16 situated between the front wheels. The unit 16 is connected by belts to the tractor engine. The unit 16 includes a power take off shaft having front and rear ends 18 and 20 available for connection to powered implements. The shaft ends 18 and 20 each have splines used for coupling them to power implements that may be situated in front of, behind, or under the tractor, to provide power to the implement. Powered implements such as a snow caster, mower, cultivator, etc., can be placed in front of, under, and/or behind the tractor body, depending upon which implements are to be used. The shaft end 20 is shown coupled to the mower or implement 12 by means of a shaft assembly 21 (partially located behind a lateral hanger) having a releasable locking collar and a front end universal joint 24. Another universal joint 26 connects the shaft 21 to a drive mechanism in a drive housing 28 of the rotary mower 12. The mower is a conventional mower having three rotary mower blades (not shown) enclosed in a mower housing 30 that is open at the bottom. A cylindrical roller R is connected by a bracket to the front of housing 30. Gauge wheels W are connected to the rear of housing 30 laterally outward of the rear vehicle wheels.

The rotary mower 12 is suspended from the tractor body by two drag links 32 pivoted on pins 36 held by brackets 38, and by pairs of links 42 and 44 that are pivotally mounted to the mower on pins 38 and 40. The links are also suspended from pins 52 mounted on associated pivoted lift arms 54 of lift assembly 14 in a manner to be explained. It will be understood that the lift assembly 14 includes left hand and right hand components which are mirror images of each other as shown in FIG. 3. Accordingly, only the left hand components will be described in detail and the same numerals will be placed on equivalent parts of the right hand components.

The two drag links are laterally spaced apart and only one of the drag links 32 is shown in FIG. 1. The drag links 32 have their rear ends pivotally attached to a forward portion of mower housing 30 by means of a drag link pin 51. The links 42 and 44 have their upper ends pivotally attached to the lift pins 52, as best shown in FIGS. 2 and 3. The upper ends of the links 42 and 44 are provided with slots 53 (FIG. 2) to receive the associated lift pins 52. The pins 52 are fitted within aligned holes in the outer ends of lift arms 54 and are held in place by retainer rings. The cooperating links 42, 44 on each side of the vehicle are interconnected by a tension spring 55. The spring 55 maintains the slots in the upper ends of links 42 and 44 from being inadvertently dislodged from the associated lift pins 52. As illustrated in FIG. 1, the two drag links 32 are the same length as pivoted lift arms 54, and are oriented parallel to them to define parallelogram linkages so that the mower 12 can be swung up and down under the tractor body while maintaining the mower blades substantially parallel to the ground.

The vehicle's lift assembly 14 (FIGS. 2 and 3) includes a shaft 56 with shaft ends rotatably journaled in bearings 58 secured to frame members 60. The shaft 56 is situated beneath the tractor body about halfway between the front and rear vehicle wheels with the shaft axis transverse to the longitudinal tractor axis. The frame members 60 are situated on opposite sides of the tractor axis. A plurality of swing arms, including the earlier identified lift arms 54, are mounted upon shaft 56 for swinging movement during lift assembly operation in respective vertical planes about the shaft axis.

Two swing arms 62 secured to shaft 56 serve as push arms which can be swung approximately 90° about the shaft axis to pivot the shaft by operating a hydraulic power unit 64. Power unit 64 includes a hydraulic cylinder 64a and a piston 64b with its lower end pivotally connected by a pin 65 to the arms 62. The upper end of cylinder 64a (FIG. 1) is pivoted to the tractor chassis in a suitable manner by a support pin 66. Two swing arms 70 are rigidly secured to shaft 56 and serve as lift arms that swing upon rotation of shaft 56. The front end of a drawbar 74 (FIGS. 2 and 3) may be pivotally connected to a pin 73 in the arms 70 in order that an unpowered implement, such as a cultivator, may be attached to and placed behind the tractor by a three-point hitch pivoted on the rear end of the tractor and also by the drawbar 74 which raises and lowers the trailing implement. Two widely spaced pick up arms 76 are secured to shaft 56 and serve as pickup arms that swing up or down when shaft 56 is rotated or counter-rotated. The pairs of pivotal swing arms 54, earlier identified, each have their inner ends welded to a sleeve 75 (one being shown in section in FIG. 3) journaled about shaft 56 so that they are able to swing relative to the shaft.

The pivoted lift arms 54 can be swung upward about shaft 56 between a lowered position (not shown) and a raised position illustrated in FIGS. 1 and 2 wherein they can be latched in place in accordance with the teachings of the present invention. The pivotal lift arms 54 are provided with pickup pins 78 positioned in the path of movement of pickup arms 76 secured to shaft 56 and movable upward into lifting contact with the pickup pins 78 to raise the lift arms 54. Each outer portion of each lift arm 54 includes a latching abutment preferably in the form of a circular hole 80 as best shown in FIG. 4, and each hole is used as a catch in order that the arms 54 may be latched in their uppermost positions.

In accordance with the invention, two identical latch mechanisms 82 are supported on frames provided with one mechanism being positioned on each side of the tractor. Each latch mechanism is supported on the associated frame member 60 for use in latching the adjacent lift arms in its raised position. Only one of the mechanisms 82, and its relation to the adjacent lift arm 54 will be described in detail, it being understood that the description is similarly applicable to the other latch mechanism.

The latch mechanism 82 (FIGS. 4 and 5) comprises a latch member or bolt 84, a resilient means or helical "torsion compression" spring 86, a channel bracket 88 through which the bolt extends, and a pin handle 90. The latch mechanism 82 is supported on frame member 60 by the channel bracket 88 which may be welded or otherwise secured to the frame 60. The bolt 84 includes a cylindrical stem 92 with an integral, non-circular, preferably square bar 94 near one end of the bolt. The latching end 96 of the bolt 84 is cylindrical and is diagonally cut to define a curved upper edge 97 (FIG. 5) and to form a cam face 98 oriented at an angle of about 60° relative to the latch bolt's longitudinal axis. The pin handle 90 is secured to the other end of the stem 92 in position to be easily gripped by the operator. The frame 60, as is best shown in FIG. 6, has a non-circular, preferably skewed, square hole 100 located in alignment with the hole 80 in the bracket. It is particularly important to note that the hole 100 is defined by sidewalls that are angled relative to the walls of the channel bracket 88 as clearly indicated in FIG. 6. The square bar 94 has chamfered edges 101 which aid in guiding the bar through the frame hole 100 to a position which locates the cam face 98 in the swing path of the lift arm 54 so that the lift arm 54 can be swung upward against cam face 98. The lift arm 54 has the previously mentioned circular hole 80 (FIGS. 4 and 5) therein that can be swung into alignment with the axis of latch bolt 84 to allow the latching end 96 of bolt 84 to enter the hole 80 and thereby latch the arm 54 in its raised position.

The coils of torsion-compression spring 86 encircle the bolt stem 92 and extend between the square bar 94 and an apertured end of the bracket 88. One end of the spring is bent over a flat side of the latch bar 94 while the other end of spring 86 extends tangentially into abutting contact with one side of the bracket 88. The spring coils are torsionally stressed during assembly of the latch mechanism 82 to maintain the spring under torsion in a direction tending to pivot the bar 94 clockwise as viewed in FIG. 6 to the unlatched position. The compressive force exerted by the spring urges the latch bolt in the latching position of FIG. 4 wherein the cam face 98 is positioned to intersect the path of movement of the nearby lift arm 54. The pin handle 90 can be pulled rearwardly by the operator, to shift the latch bolt 84 to a second or unlatched longitudinal position wherein its forward end is disposed rearwardly of the skewed square frame hole 100. Rearward movement of the bolt 94 causes compression of the spring 86 setting up a spring force urging the bolt forwardly toward its latching position. As soon as the bar 94 moves out of the hole 100, the torque applied by the spring 86 turns the bolt 84 through an angle A indicated in FIG. 6, until two opposed corner edges of square bar 94 abut the legs of bracket 88 in the manner illustrated in FIG. 6. This rotation of the bolt effects rotational misalignment of the sides of the bar 94 with the sides of the hole 100 to keep the spring compression force from returning the bolt 84 to the aforesaid latching position. In this way, the bolt 84 is locked in the unlatched position until it is manually returned to the latching position by turning the handle 90 in a counter-clockwise direction (FIG. 6) and then allowing the compressive force of the spring 86 to push the bar 94 back into the frame hole 100.

DETAILED OPERATION OF THE LIFT ASSEMBLY AND ITS LATCHING MECHANISM

The operation of the lift assembly 14 and its right and left hand latching mechanism 82 during routine use is as follows:

When the mower 12 (FIG. 1) is lowered for use it can be supported on the ground by the wheels W and roller R or can be held at any desired distance above ground level by the hydraulic power unit 64. If the mower 12 is fully lowered, piston 64b is fully retracted and push arms 62 are vertically disposed as indicated in dotted lines in FIG. 2.

During normal use of the mower 12, latch bolts 84 of each latching mechanism 82 are locked in their unlatched position by springs 86. The latch bolts 84 are positioned in their unlatched positions, by manually pulling and turning the handles 90 outward to move them to the unlatched position of FIGS. 6, 7 and 8. The torsion force of springs 86 will move the bolts 84 into the unlatching position as soon as latch bolts 84 are pulled past the associated skewed holes 100. The mower 12 can at any time be temporarily lifted up and promptly returned, if desired, to a lowered position as long as the bolts 84 of latch mechanisms 82 are allowed to remain in their unlatched positions.

Whenever the tractor operator desires to raise the mower 12 all the way up and to latch it in the raised position, it is only necessary to manually set the latch bolts 84 in their latching positions, before lifting the mower 12 by operating the lift assembly 14. To place the bolts 84 in their latching positions, handles 90 are each manually turned to rotate latch bolts 84 against the torsion spring action of springs 86 to bring the flat faces of bars 94 into rotational alignment with the sides of the skewed, square holes 100 of frame members 60. When this is done, the compressive force of the springs push the square bars 94 into the skewed square holes 100 thereby placing latch bolts 84 into their latch engaging positions wherein each cam face 98 is disposed in position to be engaged by the associated lift arm 54 as indicated in FIGS. 4 and 5. Each mechanism 82 is now ready to automatically effect latching of the adjacent lift arms 54 upon subsequent movement of lift arms 54 to their raised positions against cam faces 98. When holes 80 and 100 are aligned, the compressive force of springs 86 move the bolts in the holes 80 thus locking the mower in its fully elevated position.

With the lift arms 54 locked in their raised positions it is possible to operate the piston 64b and repeatedly raise or lower the pickup arms 76 and lever 70 thereby raising and lowering a trailing implement attached to drawbar 74 while lift arms 54 remain latched in their upraised positions, thus maintaining the mower 12 in its upper inactive position until a later time when the mower is to be lowered.

From the foregoing description it will be apparent that each latch mechanism of the present invention includes a square latch bolt mounted for limited rotation and for axial displacement within a channel bracket. The square latch bolt is normally urged into latching position through a skewed square hole by a combination torsion-compression spring allowing a camming surface on the bolt to be engaged by and deflected into holes in lift arms to lock the lift arms in raised position in response to raising the lift arms into their uppermost positions. The bolts are positively held in their unlatched position by the torsional force of the springs upon retracting the square bolts out of the skewed square holes and allowing the springs to pivot the bolts about their longitudinal axes and resiliently maintain them in this position.

Although the best mode contemplated for carrying out the present invention has been herein shown and described, it will be apparent that modification and variation may be made without departing from what is regarded to be the subject matter of the invention.

I claim:

1. A lift assembly for an implement-carrying vehicle having a frame, comprising in combination:
   a lift arm mounted on said frame for movement along a vertical path between a raised latched position and a lowered position, said arm having catch means thereon,
   an implement connected to said lift arm for vertical movement therewith,
   power means carried by said frame and operatively associated with said lift arm for effecting said movement,
   latch means mounted on said frame, said latch means including:
   a latch bolt having a non-circular body portion and a beveled forward portion defining a substantially planar cam face,
   said frame including cooperating bracket means journalling said bolt substantially perpendicular to said lift arm path (1) for limited rotational movement about an axis between a first operative position and a second inoperative position, and (2) for limited movement along said axis between a forward latching position with only a part of said cam face lying in said lift arm path, and a rearward inactive position,
   said frame and bracket means including an abutment wall provided with a non-circular opening therethrough complementary to said latch bolt body portion and through which said bolt extends,
   a torsion-compression spring about said latch bolt and rotatively and abuttingly engaging said non-circular bolt portion and connected at its other end to said bracket means, said spring relatively biasing said bolt toward said second inoperative position with said non-circular bolt portion and wall opening misaligned thereby to retain said bolt in said rearward inactive position, and,
   handle means on said bolt for rotating said bolt to said first operative position with said non-circular portion and opening aligned thereby permitting said spring to axially project said bolt toward said forward latching position and in said lift arm path,
   said lift arm in elevating to said raised position by said power means engaging said cam face and deflecting said bolt axially against said spring until said bevelled portion engages said lift arm catch means to latch said arm in raised position and from which said arm may be released by axial shifting of said bolt by said handle means.

* * * * *